3,201,355
REACTIVATION OF NOBLE METAL CATALYSTS WITH ANHYDROUS GASEOUS HALOGENS

Charles N. Kimberlin, Jr., and Elroy M. Gladrow, Baton Rouge, La., assignors to Esso Research and Engineering Company, a corporation of Delaware
No Drawing. Filed Oct. 5, 1953, Ser. No. 384,336
3 Claims. (Cl. 252—411)

The present invention relates to improvements in catalyst reactivation. More particularly, it relates to improvements in the reactivation of noble metal type catalysts which have been found to deactivate so as to be unusable or which have suffered a distinct loss of activity in the processes for which their utility is indicated. Still more particularly, this invention relates to the reactivation of metal oxide supported platinum catalysts utilized in hydroforming processes through the utilization of anhydrous gaseous halogen, particularly chlorine.

It is a matter of record and commercial practice to hydroform naphthas in the presence of a platinum catalyst. This platinum catalyst is usually supported on a suitable base, such as alumina, and may also contain a small amount of promoters or stabilizers such as boria, phosphoric anhydride, silica, halides or organic acids. For instance, a commonly used composition of such catalyst is one containing from 0.01 to 2.0 weight percent platinum, the remainder being the alumina spacing agent or base. In place of alumina, other bases having mild cracking activity are used. In this hydroforming operation virgin naphthenic naphtha is contacted at elevated temperatures and pressures with the catalyst in the presence of added hydrogen. The function of the hydrogen is to repress the formation of carbonaceous deposits on the catalyst.

The operating conditions of the hydroforming operation are pressures in the range of 50 to 1000 p.s.i.g., usually 200 to 700 p.s.i.g., and temperatures in the range of 750°–1050° F., usually 875°–950° F. The hydrogen dilution can vary from about 1000 to 10,000 c.f./b.

The feed or charging stock to the hydroforming reactor can be a virgin naphtha, a cracked naphtha, a Fischer-Tropsch naphtha, or the like. The feed stock is preheated alone or in admixture with recycle gas to reaction temperature or to the maximum temperature possible while avoiding thermal degradation of the feed stock.

These platinum catalysts have been found to deactivate with usage for various reasons, among which are changes in the physical state of the platinum. Important factors in the latter, for example, are the increased size of the platinum crystals and the rate of platinum crystal growth. Contaminants such as other heavy metals also tend to deactivate the catalyst. The deactivation resulting from these factors should be distinguished from the simpler, more easily reversible, loss of activity of the catalyst due to carbonization from the reaction or diminution in hydrocracking activity due to loss of halide which can be restored by halide addition to the hydroforming zone.

Changes in the platinum crystal lattice also account to a certain extent for catalyst deactivation. Although these changes are reversible under certain conditions of operation, the severe treatment required to alter the lattice eventually leads to an agglomeration of platinum crystallites which in the past has been considered an irreversible process. Normally, therefore, "spent" platinum catalysts are processed for the extraction, separation and recovery of the platinum which is then used to prepare fresh catalyst. This is, of course, an expensive operation, because of platinum recovery charges and cost for manufacturing new catalysts.

It has now been found that this expensive recovery operation can be completely eliminated by the reactivation process of this invention. The process of this invention comprises treating the deactivated catalyst in pilled, granular or powdered form with an anhydrous halogen-containing gas. The thus treated catalyst is then subjected to a reducing activating step, preferably with a hydrogen-containing gas, in either a separate treating zone or directly in the reaction contemplated. This process completely reactivates the deactivated catalyst so that it is again usable.

It is surprising to learn that gaseous halogens accomplish this effect, because gaseous hydrogen halides do not have the same effect on deactivated catalysts. Conversely, experimental data demonstrate that this reactivation is more than a so-called restoration of halogen content to the catalyst. The halogen content of the reactivated catalyst can be reduced to a level below that of the deactivated catalyst, but its activity remains markedly improved. In addition, other data demonstrate that catalysts of superior activity are obtained when the halogen utilized is in relatively anhydrous form.

The noble metals for treatment in accordance with the present invention include platinum, palladium, gold, silver, iridium, rhodium, ruthenium, osmium, etc. These noble metals are generally associated and supported on a metal oxide and particularly an oxide of a metal in the left hand columns of Groups III to VIII of the Periodic Table including particularly the oxides of silicon, aluminum, titanium, zirconium, hafnium, thorium, vanadium, tantalum, chromium, molybdenum, tungsten, uranium, manganese, zinc, cobalt, nickel, etc. It is understood that the catalyst can comprise two or more noble metals and/or two or more metal oxides. In still other cases, one or more activating components may be included in the catalyst. Particularly suitable is the platinum on alumina catalyst.

It is preferable that the carbonaceous deposits be first removed from the catalyst by oxidation, e.g., burning in air or an oxygen-containing gas at a temperature of from about 700° F. to about 1100° F., for a period of from about 1 to 12 hours or more. The carbonized catalyst can first be burned with dilute air, e.g., 1–2 mole percent $O_2$, at temperatures of about 900° F. In an advantageous modification the temperature is then raised to 1100° F. at higher $O_2$ pressures, e.g., 20 lbs. $O_2$ or air at 200 lbs.

Various gaseous halogens can be utilized, i.e., chlorine, fluorine, and bromine. Nitrosyl chloride can also be used. Chlorine is particularly preferred because of efficiency, cost, safety, and corrosion factors.

The chlorine-containing gases can be mixed with either oxygen-containing gases such as air or inert gases such as nitrogen, carbon dioxide, flue gas, etc.

It is to be emphasized that the process of this invention contemplates the utilization of a halogen under dry conditions. It is to be understood, therefore, that the terms "dry conditions," "anhydrous halogen," or "anhydrous chlorine" connote treatment of the catalyst with a gas comprising chlorine or other halogen, in which gas the partial pressure of water vapor is less than 0.02 atmosphere absolute, preferably less than about 0.01 atmosphere absolute.

The amount of anhydrous chlorine utilized is in the range of 0.1 to 10 weight percent on catalyst, and preferably 1 to 3 weight percent on catalyst. The partial pressure of the chlorine gas should be within the range of 0.002 to 2.0 atmospheres absolute and can range from 0.1 to 100% of the total pressure within the foregoing limits. All other things being equal, the higher the partial pressure, the more rapid the effect. However, for the treatment of fixed beds of granular or pelleted catalyst it is preferred to use a rapid flow dilute chlorine gas, preferably diluted with dry air, in which the chlorine partial pressure is within the range of about 0.002 to 0.2 atmosphere absolute. Treatment in this manner with a rapid flow of dilute chlorine gas with relatively low chlorine partial pressure results in a more even treatment than is obtained when using higher partial pressures of chlorine.

The temperature of halogen treatment utilized is in the range of ambient temperature, i.e., 200° F. to 1250° F., and preferably 800° to 1200° F. To effect economies in heat input the catalyst will generally be treated at temperatures prevailing in the unit. The preferred time interval of treatment is in the range of 1–60 minutes, but, as will be understood by those skilled in the art, the treating time can be varied to obtain the desired degree of reactivation.

The final step involves the subjection of the catalyst to activation by reduction, i.e., hydrogenation or calcination treatment. Typical of these reduction operations is treatment with hydrogen at 400°–1000° F. with hydrogenation pressures of atmospheric to 1000 pounds p.s.i.g. Calcining can be carried out at temperatures of the order of about 700°–1200° F. Combinations of these can be utilized. Actually, as stated before, it is preferable to carry out a reduction directly in the process wherein the catalyst is to be utilized, e.g., with hydrogen or hydrocarbon feed in the hydroforming process.

This invention will be better understood by reference to the following examples of the reactivation of a deactivated platinum catalyst.

*Example I*

A catalyst comprising 0.6% by weight of platinum was prepared by depositing chloroplatinic acid on alcoholate alumina. The alcoholate alumina was obtained by hydrolysis of aluminum alcoholate. This catalyst was tested for hydroforming activity at 832° F. and amospheric pressure using a redistilled virgin naphtha feed and about 14,000 cubic feet added hydrogen per barrel of naphtha feed. After aging, the activity of the catalyst declined. This deactivated catalyst was treated with anhydrous chlorine for 15 minutes at 800° F. at a partial pressure of chlorine of 1 atmosphere absolute and a partial pressure of water vapor of less than 0.001 atmosphere absolute, followed by activation by calcining for 4 hours at 100° F. The amount of chlorine used was 2% by weight of the catalyst. The activity of the catalyst for hydroforming was again determined. The catalysts were also examined by X-ray diffraction to determine if platinum crystals were detectable. The results obtained are shown in the following table:

| Catalyst | Relative Activity [1] | X-ray Diffraction, Pt Crystal Pattern |
| --- | --- | --- |
| Fresh | 122 | No Pt crystals. |
| Deactivated | 68 | Pt crystals present. |
| Chlorine Reactivated | 147 | No Pt crystals. |

[1] Referred to a reference catalyst having an assigned activity value of 100.

These data demonstrate that the anhydrous chlorine treatment restored the deactivated catalyst to an activity even greater than that of the fresh catalyst. This restoration of activity was accompanied by the desirable destruction of platinum crystals in the deactivation catalyst.

*Example II*

To further demonstrate that the treatment with anhydrous chlorine modifies the platinum or platinum-alumina combination rather than merely activating the alumina base, a sample of alcoholate alumina was treated with anhydrous chlorine in the same manner as described for the catalyst in Example I. The hydroforming activity of the alumina before and after the anhydrous chlorine treatment is shown in the following tabulation:

Relative activity
Untreated alumina _____ <5
Chlorine treated alumina _____ <5

The data show that the enhanced activity of the reactivated catalyst of Example I was not due to a "halogen activation" of the alumina base.

*Example III*

A catalyst comprising 1.0% by weight of palladium on alcoholate alumina, after losing hydroforming activity through aging, was restored by treatment with anhydrous chlorine gas. The reactivation was accomplished by treatment with anhydrous chlorine for 15 minutes at 1000° F. at a partial pressure of chlorine of 1 atmosphere absolute and a partial pressure of water vapor of less than 0.001 atmosphere absolute. The amount of chlorine used was 2% by weight of the catalyst. The hydroforming activities of the fresh, deactivated and reactivated catalysts are shown in the following tabulation:

Catalyst (1% Pd): Relative activity
    Fresh _____ 50
    Deactivated _____ 39
    Reactivated _____ 71

*Example IV*

The effects of temperature, chlorine partial pressure, and water addition with the chlorine were studied. The data presented in the table below were obtained on samples of a catalyst comprising 0.6 weight percent platinum on alcoholate alumina whose activity had declined after aging to a relative activity [1] of 34. The fresh catalyst had a relative activity of 85. The hydroforming tests were made at 832° F., atmospheric pressure, and about 14,000 cubic feet of hydrogen per barrel of virgin naphtha feed. After the indicated reactivation treatments with chlorine the catalyst systems were stripped with air

[1] Relative to standard alcoholate alumina catalyst heated two hours at 900° F.=100.

and the catalysts activated by calcining for four hours at 1000° F. in air. The results are presented below:

| | Time, Min. | Temperature, °F. | Cl₂ Rate, W./Hr./W. | Cl₂ Part. Press., Atm. | H₂O Addition | | Rel. Act.¹ |
|---|---|---|---|---|---|---|---|
| | | | | | Cl₂ | Strip. | |
| Effect of temperature of Cl₂ treat | | | | | | | |
| I | 15 | 600 | 0.08 | 1 | Dry | Dry | 80 |
| | 15 | 800 | 0.08 | 1 | Dry | Dry | 104 |
| | 15 | 1,000 | 0.08 | 1 | Dry | Dry | 104 |
| | 15 | 1,200 | 0.08 | 1 | Dry | Dry | 100 |
| Effect of Chlorine Partial Pressure, Atm. | | | | | | | |
| II | 15 | 1,000 | 0.08 | 1 | Dry | Dry | 104 |
| | 22 | 1,000 | 0.05 | 0.03 | Dry | Dry | 115 |
| | 22 | 1,000 | 0.05 | 0.0025 | Dry | Dry | 113 |
| Effect of H₂O Addition During Rejuvenation | | | | | | | |
| III | 22 | 1,000 | 0.05 | 0.03 | Dry | Dry | 115 |
| | 22 | 1,000 | 0.05 | 0.03 | Wet² | Wet² | 82 |
| | 15 | 800 | 0.08 | 1 | Dry | Dry | 104 |
| | 15 | 800 | 0.08 | 1 | Dry | Wet² | 100 |

¹ Relative to standard alcoholate alumina catalyst heated two hours at 900° F.=100.
² The partial pressure of water in the gas was approximately 0.025 atmosphere.

These data show that temperatures in the range of 800°–1200° F. are equivalent. A temperature of 600° F. is less effective.

Very low partial pressure of chlorine is as effective as higher partial pressures, and, as indicated above, are preferred with fixed beds of catalyst, in order to get an even treatment throughout the catalyst bed.

These data also demonstrate the importance of utilizing anhydrous chlorine in the reactivation process. The exceeding of the upper limit on water vapor by even a small amount gave much poorer results.

*Example V*

A catalyst consisting of alcoholate alumina impregnated with 0.6 weight percent platinum activated by heating four hours at 1000° F. was utilized in the hydroforming of a virgin naphtha at 900° F. and 200 pounds per square inch pressure with 5,000 cubic feet of hydrogen per barrel of feed. The catalyst deactivated after aging and was reactivated first by heating to 1000° F. with a flow of dry air to remove carbonaceous deposits. Anhydrous chlorine gas was then added to the air and passed over the catalyst. Chlorine treating conditions were as follows: 20 minutes at a temperature of 1000° F., a partial pressure of chlorine of 0.025 atmosphere, and a partial pressure of water vapor of less than 0.001 atmosphere. The total amount of chlorine added amounted to only 1.2 weight percent on the dry supported catalyst. The hydroforming data are presented below:

| Catalyst | Fresh | Deactivated | Reactivated |
|---|---|---|---|
| Correlated Data | At 95 Octane No. | | |
| Feed Rate, W./Hr./W. | 2.0 | 1.6 | 3.3 |
| C₅+ Yield, Vol. percent | 82 | 78 | 86 |

The C₅+ yield data show the selectivity of the reactivated catalyst is better than that of the fresh.

The reactivated platinum type catalysts of this invention are adapted for use in hydroforming, hydrogenation, oxidation, and other reactions known to those in the art.

Numerous advantages of the process of this invention are apparent. An extremely large saving results from reactivating the catalyst directly without dissolving away of the platinum from the support or destruction of the expensive support material. Another advantage is that the reactivation process of this invention, because of its flexibility of operation, can be incorporated directly into some of the operations for which the catalysts are utilized. For example, the reactivation treatment can be incorporated into a process for hydroforming with platinum-alumina catalysts carried out in fixed, fluid, or moving bed.

The process of this invention also has utility in improving and preparing fresh catalyst and removing contaminants.

It is to be understood, therefore, that this invention is not limited to the specific examples, which have been offered merely as illustrations, and that modifications may be made without departing from the spirit of the invention.

What is claimed is:

1. Method of reactivating a platinum-containing catalyst which has become deactivated in a process for converting hydrocarbons which comprises contacting the deactivated platinum-containing catalyst with gaseous nitrosyl chloride.

2. Method of reactivating a platinum-containing catalyst which has become deactivated in a process for converting hydrocarbons which comprises contacting the deactivated platinum-containing catalyst with gaseous nitrosyl chloride for from 5 minutes to 2 hours, and removing nitrosyl chloride from the reactivated catalyst.

3. A method of reactivating a platinum-containing catalyst which has become deactivated in a process for converting hydrocarbons which comprises contacting the deactivated platinum-containing catalyst with gaseous nitrosyl chloride for about 1–60 minutes.

References Cited by the Examiner

UNITED STATES PATENTS

| 2,479,110 | 8/49 | Haensel | 196—50.2 |
| 2,641,581 | 6/53 | Haensel | 196—50.2 |
| 2,642,384 | 6/53 | Cox | 196—50.2 |
| 2,851,398 | 9/58 | Gornowski et al. | 252—416 X |
| 3,134,732 | 5/64 | Kearby et al. | 208—140 |

OTHER REFERENCES

"Chlorine Handbook," Diamond Alkali Company, 300 Union Commerce Bldg., Cleveland 14, Ohio, pages 7, 8, 12 and 18.

ALPHONSO D. SULLIVAN, *Primary Examiner.*

EARL M. HUTCHINSON, JULIUS GREENWALD, MILTON STERMAN, DANIEL E. WYMAN, *Examiners.*